United States Patent [19]
Morton et al.

[11] 3,724,180
[45] Apr. 3, 1973

[54] STEAM HUMIDIFIER WITH CENTRIFUGAL SEPARATOR

[75] Inventors: Bernard W. Morton, Hopkins; Willard E. Morton, Minneapolis, both of Minn.

[73] Assignee: Environmental Industires Inc., Hopkins, Minn.

[22] Filed: Jan. 22, 1971

[21] Appl. No.: 108,706

[52] U.S. Cl. .....................55/410, 55/456, 239/132
[51] Int. Cl. ..............................................B01d 45/12
[58] Field of Search................55/191, 217, 203–205, 55/417, 410, 419, 453, 454, 456; 239/132; 165/19, 20; 62/91; 236/44 R

[56] References Cited

UNITED STATES PATENTS

| | | |
|---|---|---|
| 1,820,734 | 8/1931 | Feldmann............................165/20 |
| 1,981,549 | 11/1934 | Hawley.................................55/450 |
| 2,141,829 | 12/1938 | Schneible.............................55/455 |
| 2,843,265 | 7/1958 | Rakowsky...........................209/211 |
| 3,374,857 | 3/1968 | Hutchins..............................55/450 |
| 3,386,659 | 6/1968 | Rea.....................................239/132 |
| 3,486,697 | 12/1969 | Fraser..................................261/118 |
| 1,737,680 | 12/1929 | Pinkham...............................55/204 |

*Primary Examiner*—Bernard Nozick
*Attorney*—Dugger, Peterson, Johnson & Westman

[57] ABSTRACT

A steam humidifier used to maintain the relative humidity within a desired range in buildings which utilizes a dispersion tube that has a jacket through which the steam passes to keep the dispersion tube at steam temperature, and which has a centrificial separator in the input line to separate out water droplets or slugs of condensate so that no liquid is emitted from the dispersion tube with the steam.

4 Claims, 4 Drawing Figures

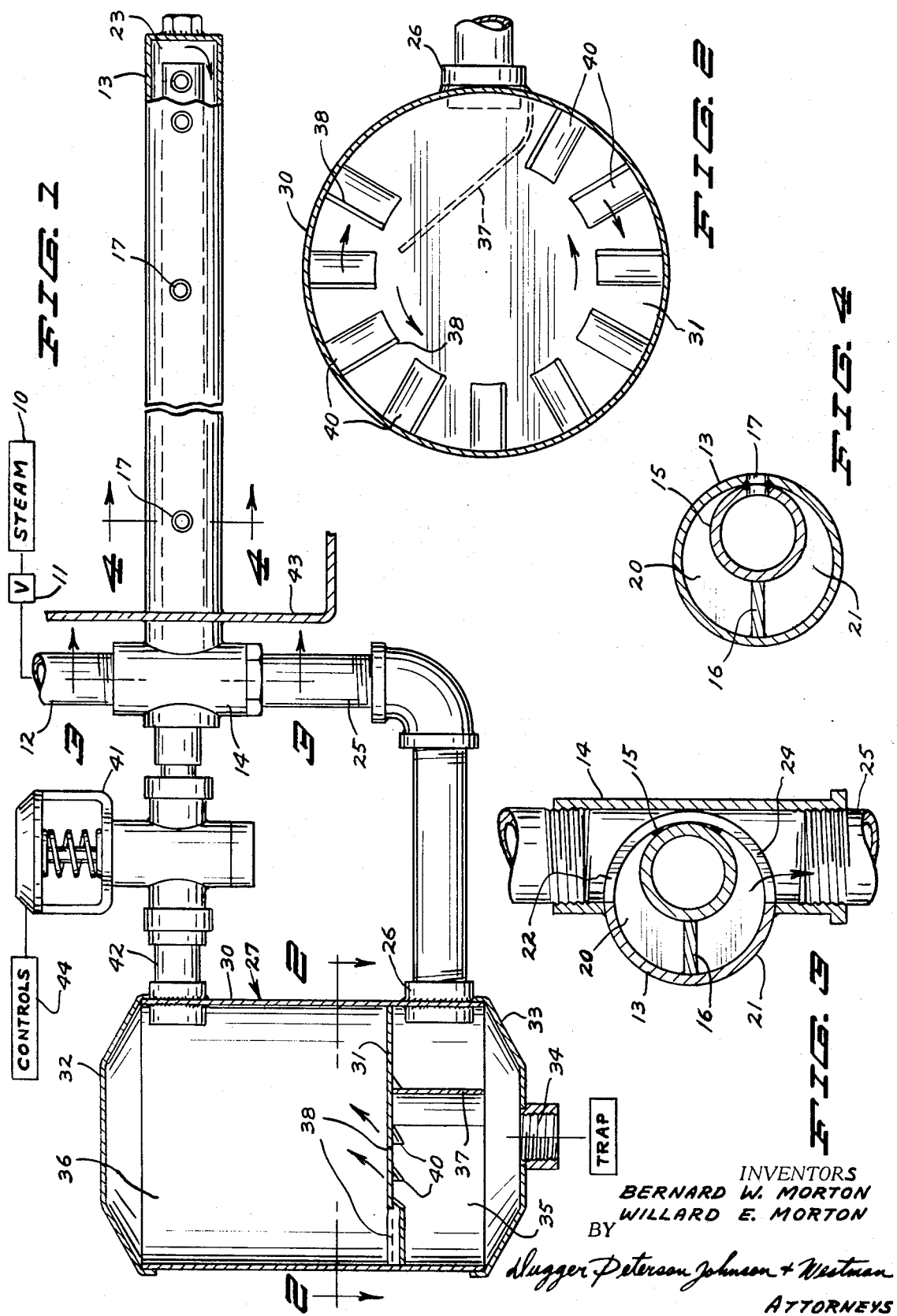

STEAM HUMIDIFIER WITH CENTRIFUGAL SEPARATOR

BACKGROUND OF THE INVENTION

1. Field of the Invention

The present invention relates to steam humidifiers which have a separator for separating out condensate from the steam.

2. Prior Art

In the prior art there have been humidifiers presented which utilize steam as the humidifying agent, and which also use a dispersion tube which is heated by the steam as it flows through the system to keep the dispersion tube at the same temperature as the steam. Steam-water separators which operate on a "trap" type principle have been used in these systems. The prior art devices used cast iron with an interior re-evaporating chamber which is much heavier and more costly to manufacture.

SUMMARY OF THE INVENTION

The present invention relates to a steam humidifier which utilizes a centrifugal action separator for separating droplets of water and slugs of condensate from the steam prior to entry of the steam into the dispersion tube used for the humidifier. The present humidifier is utilized in buildings to control the humidity level, generally in response to a humidity sensing control. The device of the present invention includes a steam dispersion tube that as shown is mounted inside an outer jacket, and the incoming steam, which is at line pressure circulates around the dispersion tube. This keeps the dispersion tube hot, so no condensation will take place as the steam is emitted. The steam passes through a highly efficient centrifugal separator which operates to separate out all water droplets and slugs of condensate. The outlet of the centrifugal separator is connected to the inlet of the control valve for the dispersion tube, and the control valve which operates in response to the humidistat control will open in response to the signals from the controls to permit the dewatered or dry steam into the dispersion tube. The highly efficient steam separator separates the water or condensate out of the steam, and because the dispersion tube is pre-heated, no further condensation occurs. Thus the two features co-operate to insure absence of condensate in the air supply system.

Normally the dispersion tube will be located in an air duct or air supply for the heating unit of a building so that the steam will be introduced into the air as water vapor eliminating problems with slugs of condensate and water droplets being present in the duct. The control of the humidity is more reliable, and it can be easily controlled even when large quantities of humidifying water vapor are necessary.

BRIEF DESCRIPTION OF THE DRAWINGS

FIG. 1 is an elevational view of a humidifier utilizing a centrifugal separator made according to the present invention, and which is shown in cross section;

FIG. 2 is a sectional view taken as in line 2—2 in FIG. 1;

FIG. 3 is a fragmentary sectional view taken as in line 3—3 in FIG. 1; and

FIG. 4 is a sectional view taken as on line 4—4 in FIG. 1.

DESCRIPTION OF THE PREFERRED EMBODIMENT

The humidifier as shown in FIG. 1 received steam from a steam source indicated at 10 and which flows through a main on off valve 11, into a supply pipe 12. The supply pipe 12 is connected to a fitting 14 which opens into a transversely extending jacket pipe 13 of a steam distribution header. Fitting 14 as shown best in FIG. 3, opens to a chamber in the jacket pipe 13, on the inlet side. A distribution tube 15 is inside the jacket pipe 13 and extends transversely through the fitting 14. The distribution tube is positioned so that it is against one side of the outer jacket pipe 13, and has a divider wall 16 attached thereto to hold the tube 15 against this side. The distribution tube has a plurality of openings shown at 17 defined therethrough and the jacket pipe 13 also has openings as shown in FIG. 4. The openings 17 of the jacket pipe and the distribution tube align, and the pipe and tube are welded together along the interior of these openings. Therefore divider 16, and the distribution tube 15 together divide the jacket pipe 13 and the fitting 14 into two chambers illustrated at 20 and 21, respectively.

The incoming steam passes from the inlet side of fitting 14 into the chamber 20 through an opening 22 in the pipe 13 and the steam then travels longitudinally along the length of the jacket pipe as shown in FIG. 1, past the end of the distribution tube 15, through an end passageway 23 and back into the chamber 21, toward the end of the pipe 13 connected to fitting 14. Then the steam will pass through an opening 24 to the outlet side of the fitting 14, and into a further extension of the supply pipe shown at 25. The distribution tube 15 and wall 16 divide the fitting 14 into two parts, so the steam has to pass through chambers 20 and 21. Pipe 25 connects to a fitting 26 having an opening leading into a steam separator assembly 27. The steam separator assembly is of the centrifugal type, and includes an outer cylindrical housing 30, that is divided into two chambers with a transverse barrier wall 31 sealed along the peripheral edges of the cylinder. The housing further has a closed top wall 32, and a bottom wall 33 with an outlet opening 34 that can lead to a conventional steam trap and then to a drain.

The barrier wall 31 divides the housing 30 into a lower chamber 35, and an upper outlet chamber 36. A baffle wall 37 is provided below the barrier wall 31 and the baffle wall is aligned with the opening of the fitting 26, as shown in FIG. 2, so that the steam coming into the housing 30 through the opening of the fitting 26 will be deflected around the periphery of the housing 30 because of the direction of this baffle wall 37.

The only outlets between the lower chamber 35 and the outlet chamber 36 are through openings indicated at 38 defined in the barrier wall 31 adjacent the outer peripheral edges thereof, and these openings are formed by deflecting tabs or vanes 40 downwardly from the baffle wall and leaving a space defining the openings 38 adjacent to the outer ends of these vanes. The vanes are partial punch out pieces that are bent downwardly so that in relation to the direction of travel of the steam as it moves around the housing 30 the vanes deflect the steam downwardly. In order to go up through the openings 38 into the chamber 36 the steam has to change direction and flow around these vanes 40 into the openings 38 and then up into the chamber 36.

The heavier droplets of water are thus separated out. There are no vanes directly above inlet fitting 26 so the steam has to start in an annular pattern before it can flow into chamber 36.

The flow of steam through the separator, and through the distribution pipe 15 is controlled by a valve indicated generally at 41 situated at an outlet pipe 42 that opens into the upper chamber 36 of housing 30. The outlet pipe 42 connects to the distribution pipe 15. If the master valve 11 is open, any time the valve 41 opens steam will flow through the system. The flow is thus through the centrifugal separator into the distribution tube 15 out through the openings 17 and into an air duct or similar system. For sake of illustration, a duct wall is shown schematically at 43, and it is to be understood that the distribution tube can extend into an air duct, or into the interior of the air distribution system. The valve 41 is operated by suitable controls 44. Dry steam will be discharged through the openings 17. The distribution tube 15 will be maintained at the temperature of the incoming steam because of the jacket pipe 13 which directs the flow of the incoming steam around the distribution tube, and then through the outlet pipe 25 into the lower chamber 35 in the cylindrical separator.

The steam coming into the housing 30 will be deflected by the wall 37 and will swirl around the centrifugal separator, will be deflected by the vanes 40 and only then permitted to go up through the openings 38. This will cause droplets of water to drop onto the bottom wall 33 and drain out through the outlet 34. The outlet 34 can lead to a conventional steam trap or the like for getting rid of the condensate. Dry steam only then will pass to the chamber 36, and through the outlet pipe 42 into the distribution tube 15. The controls 44 can be in many desired configuration such as the humidistat in the room that is being supplied with humidifying steam.

The centrifugal separator is relatively simple to make, and is highly efficient to insure a supply of dry steam to the distribution system for humidity control.

It also should be understood that several distribution pipes can be fed from one valve 41 and one centrifugal separator 27 merely by putting a header leading to all the distribution pipes on the output side of the valve 41. The inlet steam would still pass through the centrifugal separator before going to the header so that water and water droplets are removed from the steam prior to its introduction into the air supply for the building.

The valve 41 is of a modulating type that alternately turns on and shuts off the steam, so that an adequate supply is maintained. The separator does not require any filter that will clog or require replacement, but operates on a foolproof centrifugal force action with small vanes that deflect steam downwardly, and requires the steam to change direction of flow as it passes from the inlet fitting 26 to the outlet openings 38.

What is claimed is:

1. In a steam humidifier having a steam inlet supply pipe and a steam distribution pipe, the improvement comprising a water-steam separator on the inlet side of said steam distribution pipe, said separator including a housing having a generally central longitudinal axis, a barrier wall in said housing dividing said housing into first and second chambers, said inlet supply pipe opening into a first of said chambers, and said steam distribution pipe opening from a second of said chambers, deflector means mounted on the interior of said housing in the first chamber to cause steam entering said first chamber from said inlet supply pipe to move in an annular pattern around the peripheral wall of said housing, said barrier wall being provided with a plurality of openings adjacent the periphery of said housing to permit passage of steam from said first chamber to said second chamber and then into the steam distribution pipe, a separate deflector tab member adjacent each of said openings in said barrier wall, said deflector tab members being attached to said barrier wall and extending out of the plane of said barrier wall into said first chamber, and being inclined to deflect steam moving around the periphery of said housing away from the barrier wall and said second chamber, whereby steam passing from said first chamber to said second chamber must move away from the barrier wall and change direction before moving through the openings into said second chamber, and drain means leading from said first chamber.

2. The combination specified in claim 1 wherein said first chamber is positioned below said barrier wall.

3. The combination specified in claim 1 and a deflector wall adjacent the opening of the inlet supply pipe to said housing to deflect said steam into its annular pattern as the steam enters said housing.

4. The combination specified in claim 1 wherein said barrier wall is constructed so that it does not have any openings immediately adjacent the steam inlet.

* * * * *